US012427799B2

(12) United States Patent
Brandol et al.

(10) Patent No.: US 12,427,799 B2
(45) **Date of Patent: *Sep. 30, 2025**

(54) METHOD AND ITEM FOR INDENTIFYING SERIALIZED PARTS

(71) Applicant: SILENCERCO WEAPONS RESEARCH, LLC, West Valley City, UT (US)

(72) Inventors: Casey Brandol, West Jordan, UT (US); Jacob Turnblom, West Valley City, UT (US); Jared Hansen, West Valley City, UT (US); James Torgersen, Orem, UT (US); Joshua Sensinger, Genola, UT (US)

(73) Assignee: SILENCERCO WEAPONS RESEARCH, LLC, West Valley City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,181

(22) Filed: May 22, 2024

(65) Prior Publication Data

US 2024/0308263 A1 Sep. 19, 2024

Related U.S. Application Data

(63) Continuation of application No. 17/749,940, filed on May 20, 2022, now Pat. No. 12,023,949.

(60) Provisional application No. 63/191,494, filed on May 21, 2021.

(51) Int. Cl.
*F41A 21/30* (2006.01)
*B42D 15/00* (2006.01)

(52) U.S. Cl.
CPC .......... *B42D 15/0033* (2013.01); *F41A 21/30* (2013.01)

(58) Field of Classification Search
None
See application file for complete search history.

(56) References Cited

U.S. PATENT DOCUMENTS 4,346,530 A * 8/1982 Stewart .................. F41C 23/18 42/71.01
5,632,108 A * 5/1997 Ruger .................... F41C 23/10 42/71.02
7,739,821 B1 * 6/2010 Hamme ................. F41C 23/04 42/8
8,650,793 B1 * 2/2014 Mendez ............... F41G 11/003 42/90
8,789,305 B1 * 7/2014 DiChario ................ F41A 3/66 42/75.03

(Continued)

OTHER PUBLICATIONS

International Searching Authority, “International Search Report & Written Opinion,” PCT/US2022/030341, dated Sep. 8, 2022 (14pages).

(Continued)

*Primary Examiner* — Derrick R Morgan
(74) *Attorney, Agent, or Firm* — Holland & Hart LLP

(57) ABSTRACT

Serialized firearm parts, such as silencers, are identified using plates permanently affixed to the parts by welding, brazing, riveting, pinning and welding or other permanent techniques. Methods of effecting repair or replacement of silencers and silencer parts employ removing the plates by drilling or machining the welds and permanently affixing the plate to a replacement part.

20 Claims, 2 Drawing Sheets

(56) References Cited

U.S. PATENT DOCUMENTS

| | | | | |
|---|---|---|---|---|
| 9,310,160 | B1 * | 4/2016 | DiChario | F41C 23/10 |
| 11,326,847 | B1 * | 5/2022 | Bango | F41A 17/063 |
| 11,326,849 | B2 * | 5/2022 | Edminster | F41A 21/30 |
| 11,466,954 | B2 * | 10/2022 | Hughes | F41C 23/10 |
| 2005/0045056 | A1 * | 3/2005 | EkenediliChukwu | F42B 39/26 102/501 |
| 2008/0127538 | A1 * | 6/2008 | Barrett | F41A 19/01 434/24 |
| 2011/0029009 | A1 * | 2/2011 | Dietl | F41C 27/00 40/672 |
| 2016/0061551 | A1 * | 3/2016 | Petersen | F41A 21/30 89/14.4 |
| 2016/0161205 | A1 * | 6/2016 | Wynalda, Jr. | G06Q 90/00 705/500 |
| 2017/0350669 | A1 * | 12/2017 | Latka | F41A 21/30 |
| 2018/0100712 | A1 * | 4/2018 | Tompkins | F41A 19/15 |
| 2018/0129920 | A1 * | 5/2018 | Henry | G06K 7/1413 |
| 2019/0339036 | A1 * | 11/2019 | Edminster | F41A 21/30 |
| 2021/0270551 | A1 * | 9/2021 | Underwood | F41A 35/06 |
| 2022/0290939 | A1 * | 9/2022 | Lee | F41A 19/15 |
| 2022/0307789 | A1 * | 9/2022 | Kloepfer | F41A 17/56 |
| 2022/0325980 | A1 * | 10/2022 | Walker | F41C 23/18 |
| 2022/0371354 | A1 * | 11/2022 | Brandol | F41A 21/30 |
| 2023/0107368 | A1 * | 4/2023 | Hughes | F41A 19/12 434/21 |

OTHER PUBLICATIONS

Department of Justice, Bureau of Alcohol, Tobacco, Firearms and Explosives, “Identification Markings Placed on Firearm Silencers and Firearm Mufflers,” Federal Register, vol. 81, No. 86, May 4, 2016 (4 pages).

Coda evolution: “Personal equipment tag”, Jan. 1, 2021, retrieved from the Internet: URL:https://codaevolution.com/products/coda-pet-personal-equipment-tagmiok-compatible-id.tag [retrieved on Sep. 8, 2022].

* cited by examiner

METHOD AND ITEM FOR INDENTIFYING SERIALIZED PARTS

CROSS REFERENCE

The present Application for Patent is a continuation of U.S. patent application Ser. No. 17/749,940 by Brandol et al., entitled "METHOD AND ITEM FOR IDENTIFYING SERIALIZED PARTS" filed May 20, 2022, which claims the benefit of U.S. Provisional Patent Application No. 63/191,494 by Brandol et al., entitled "METHOD AND ITEM FOR IDENTIFYING SERIALIZED PARTS" filed May 21, 2021, each of which is assigned to the assignee hereof, and is expressly incorporated by reference in its entirety herein.

FIELD OF THE INVENTION

This invention relates to firearms, and serialized parts such as silencers.

BACKGROUND

The Gun Control Act of 1968 requires that all firearms manufactured or imported into the US bear a serial number. The serial number must be conspicuously engraved, cast or stamped on the firearm frame or receiver. Previously, the National Firearms Act of 1934 defined categories of regulated firearms. In this classification scheme, silencers were defined as Title II weapons (along with machine guns), and are thus subject to an expensive stamp tax and required to bear a serial number even though not a firearm. Silencers and machine guns are most heavily regulated. In fact, the components of a silencer are considered as "silencers" by themselves and the replacement parts are regulated. However, the repair of original parts without replacement can be done by the original manufacturer, an FFL (Federal Firearms License) gunsmith, or by the registered owner without being subjected to new registration as long as the serial number and the caliber are maintained. The length of a silencer may be reduced in repair, but cannot be increased. Increasing the length is considered as making a new silencer.

Silencers are subject to considerable wear in their use. Multiple cycles of high internal pressure, projectile strikes on baffles and high gas temperature all take their toll and may require repair or replacement of silencer parts to maintain optimum performance. Furthermore, it may be desirable to change the length of a silencer for a particular need, for example to reduce weight and length. The laws governing silencers however, make repair and replacement a costly and time consuming process. There is clearly an opportunity to improve the ability to repair or replace silencers while still operating safely and within the law.

DETAILED DESCRIPTION

Figure 1:
FIG. 1 is an isometric view of an example serialized plate according to the invention.
Figure 2:
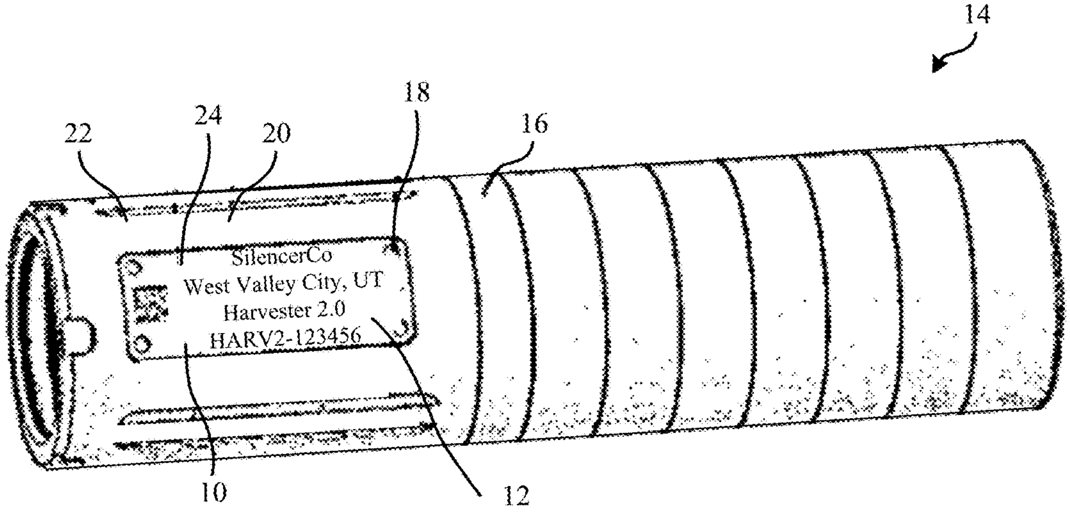
FIG. 2 is an isometric view of an example serialized plate and other essential parts of a silencer according to the invention.
Figure 3:
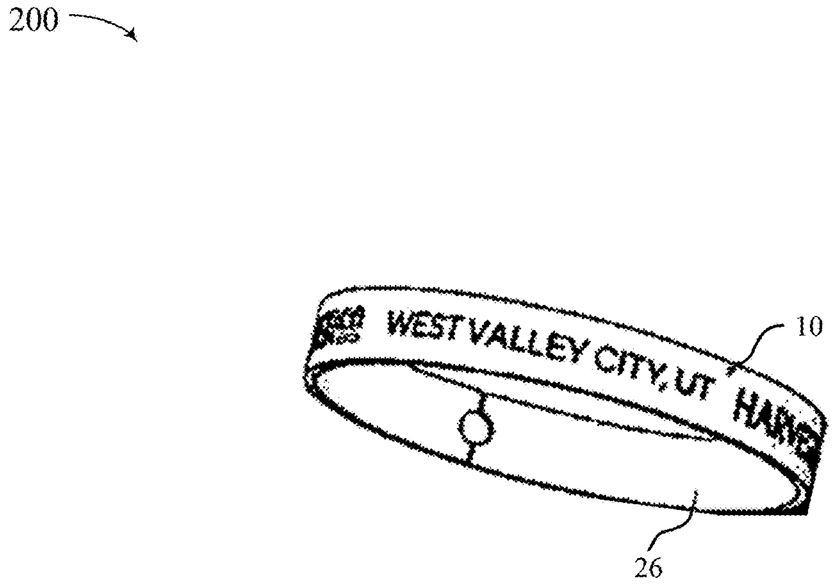
FIG. 3 is an isometric view of another example serialized plate according to the invention.
Figure 4:
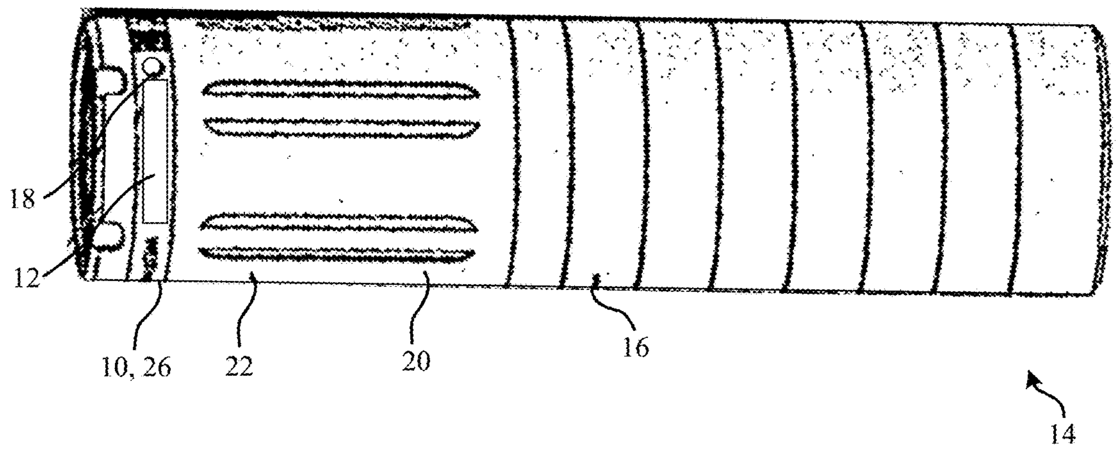
FIG. 4 is an isometric view of another example serialized plate and other essential parts of a silencer plate according to the invention.

FIG. 1 shows an example plate 10 used to identify a serialized part, in this example a silencer. Plate 10 is advantageously made from a durable metal, for example titanium, steel or heat treated steel. Plate 10 bears a serial number 12 among other indicia, the serial number 12 being engraved in the plate 10 and thus plate 10 is also considered a serialized part, serialized plate 10. FIG. 2 shows an example serialized part 14 comprising the serialized plate 10 bearing the serial number 12 and a silencer 16. Plate 10 is permanently affixed to an essential part of silencer 16, in this example the expansion chamber 20. In this context the term "permanently affixed" means that the plate 10 is attached to silencer 16 using a technique which makes it difficult to remove. Such techniques include processes such as welding, brazing, riveting and pinning and welding. In this example embodiment, four plug welds 18 are used to attach plate 10 to the expansion chamber 20 of the silencer 16. Plug welding plate 10 to silencer 16 clearly meets the definition of "permanently affixing" plate to part as provided herein, as the plug welds 18 must be carefully drilled out or removed by a machining process to effect removal of the plate 10 without damaging the silencer 16. To further increase the difficulty of plate removal the plate 10 may be inlaid into an outer surface 22 of the silencer 16. In this example a surface 24 of the plate 10 is inlaid flush with the outer surface 22 of the silencer 16. Although plate 10 has a polygonal shape (in this example a rectangle) in FIGS. 1 and 2, plate 10 may take any practical form and curvature as needed to adapt it to a particular essential part of the silencer 16. As shown in FIGS. 3 and 4, the plate 10 comprises a ring 26 plug welded to the silencer 16.

The invention further encompasses a method of identifying a serialized part such as a silencer. In an example embodiment, the method comprises permanently affixing a serialized plate 10 bearing a serial number 12 to the part 14. Permanently affixing the plate 10 may comprise welding, brazing, riveting or pinning and welding the serialized plate 10 to the part 14 as described above for FIGS. 2 and 4 wherein the serialized part comprises a silencer 16. The method may further comprise inlaying the plate 10 into an outer surface 22 of the silencer 16 or other part prior to the step of permanently affixing the plate to the part.

Also encompassed by the invention is a method of effecting repair of an essential part of a silencer. An example part 14 (silencer 16) is shown in FIG. 2 and comprises the serialized plate 10 bearing a serial number 12 thereon. The plate 10 is permanently affixed to part 12 as by welding, brazing, riveting, pinning and welding or another technique having the requisite characteristics consistent with permanent attachment as defined herein. An example method of effecting repair according to the invention comprises:

- an owner of the silencer, including the serialized plate, releasing the silencer to a manufacturer thereof;
- the manufacturer removing the serialized plate from the original essential part and permanently affixing the serialized plate to an essential replacement part;
- the manufacturer releasing the silencer, including the serialized plate and replacement essential part, to the owner;
- the manufacturer retaining the original essential part.

A further example method of effecting repair of an essential part of a silencer method may comprise:

- an owner of the silencer, including the serialized plate, releasing the silencer to a holder of a Federal Firearms License;

the holder of the Federal Firearms License removing the serialized plate from the original essential part and permanently affixing the serialized plate to a replacement essential part;

the holder of the Federal Firearms License releasing the silencer, including the serialized plate and replacement essential part to the owner;

and the holder of the Federal Firearms License retaining the original essential part.

Regardless of whether the example repair method requires release of the silencer, including the serialized plate to a manufacturer or a holder of a Federal Firearms License, various steps of the method are common. For example, the step of removing the serialized plate may comprise drilling or machining out welds permanently attaching the serialized plate to the original essential part. Permanently affixing the serialized plate to the essential replacement part may comprise welding, brazing, riveting or pinning and welding the serialized plate to the replacement essential part. When the serialized part comprises a silencer, the essential replacement part may be shorter than the original essential part, or the replacement essential part may be a different caliber from the original essential part. When the method requires release of the silencer, including the serialized plate to a manufacturer, the manufacturer may be the original manufacturer of the silencer, or another manufacturer of similar parts.

The invention also includes methods of replacing an essential part of a silencer. One example method comprises:

an owner of the silencer, including the serialized plate releasing the silencer to a manufacturer thereof;

the manufacturer removing the serialized plate from the original essential part and permanently affixing the serialized plate to a replacement essential part;

the manufacturer releasing the silencer, including the serialized plate and replacement essential part to the owner;

the manufacturer retaining the original essential part.

Another example method of replacing an essential part comprises:

an owner of the serialized silencer, including the serialized plate, releasing the serialized silencer to a holder of a Federal Firearms License;

the holder of the Federal Firearms License removing the serialized plate from the original essential part and permanently affixing the plate to a replacement essential part;

the holder of the Federal Firearms License releasing the silencer, including the serialized plate and replacement essential part to the owner;

the holder of the Federal Firearms License retaining the original essential part.

Regardless of whether the example replacement method requires release of the serialized part to a manufacturer or a holder of a Federal Firearms License, various steps of the method are common. For example, the step of removing the serialized plate may comprise drilling or machining out welds permanently attaching the serialized plate to the original essential part. Permanently affixing the serialized plate to the essential replacement part may comprise welding, brazing, riveting or pinning and welding the plate to the serialized replacement part. For a serialized silencer, the essential replacement part may be shorter than the original essential part, or the replacement essential part may be a different caliber from the original essential part. When the method requires release of the silencer, including the serialized plate to a holder of a Federal Firearms License, the holder may be the original holder from which the silencer was purchased, or another holder of a Federal Firearms license.

What is claimed is:

1. A method, comprising:

inlaying a plate bearing an engraved serial number in a recessed portion of an outer surface of an essential part of a silencer, wherein an interior surface of the plate follows a first arc, wherein the outer surface of the essential part follows a second arc, and wherein the first arc and the second arc are concentric when the plate is inlaid on the recessed portion; and permanently affixing the plate to the recessed portion.

2. The method of claim 1, wherein permanently affixing the plate to the recessed portion comprises:

welding, brazing, riveting, or pinning and welding the plate to the recessed portion.

3. The method of claim 1, further comprising:

after permanently affixing the plate to the recessed portion, attaching the essential part to a second part of the silencer.

4. The method of claim 1, wherein an outer surface of the recessed portion follows a third arc substantially concentric with the second arc.

5. The method of claim 1, further comprising:

forming the essential part and wherein a shape of the recessed portion is similar to a shape of the plate.

6. The method of claim 1, wherein an outer surface of the plate follows a fourth arc that is concentric with the first arc and the second arc.

7. The method of claim 6, wherein:

the outer surface of the plate is flush with the outer surface of the essential part.

8. The method of claim 1, wherein an outer surface of the plate is flush with the outer surface of the essential part.

9. A silencer, comprising:

an essential part comprising an outer surface having a recessed portion; and a plate bearing an engraved serial number, wherein the plate is inlaid and permanently affixed to the recessed portion, wherein an interior surface of the plate follows a first arc, and wherein the outer surface of the essential part follows a second arc that is substantially concentric with the first arc.

10. The silencer of claim 9, wherein the essential part is an expansion chamber of the silencer.

11. The silencer of claim 9, wherein the plate is welded or brazed to the essential part.

12. The silencer of claim 9, wherein:

an outer surface of the recessed portion follows a third arc substantially concentric with the second arc.

13. The silencer of claim 2, wherein:

an outer surface of the plate follows a fourth arc that is substantially concentric with the second arc.

14. The silencer of claim 9, wherein an outer surface of the plate is substantially flush with the outer surface of the essential part.

15. The silencer of claim 9, wherein the recessed portion and the plate have a polygonal shape or a rectangular shape.

16. The silencer of claim 9, wherein the recessed portion extends around at least a portion of a circumference of the essential part of the silencer and the plate has a circular shape.

17. A method, comprising:

receiving an essential part of a silencer, wherein:

a plate bearing an engraved serial number is inlaid and permanently affixed to a recessed portion of an outer surface of the essential part, an interior surface of the plate follows a first arc, and the outer surface of the essential part follows a second arc that is concentric with the first arc;

removing the plate from the essential part; and permanently affixing the plate to a replacement essential part.

18. The method of claim 17, wherein the essential part is operably connected to one or more additional silencer components to form the silencer.

19. The method of claim 17, further comprising:

releasing, after permanently affixing the plate to the replacement essential part, the replacement essential part; and retaining, after releasing the replacement essential part, the essential part.

20. The method of claim 17, wherein:

an outer surface of the recessed portion follows a third arc substantially concentric with the second arc.

* * * * *